Figure 4:
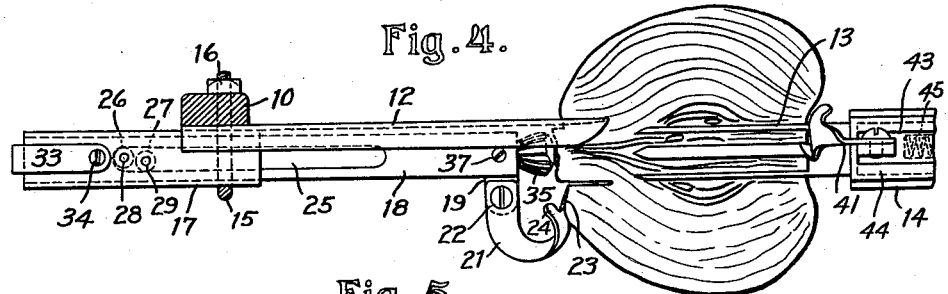

H. T. DONOVAN.
PARING MACHINE.
APPLICATION FILED DEC. 22, 1910.
1,013,280.
Patented Jan. 2, 1912.
2 SHEETS—SHEET 1.
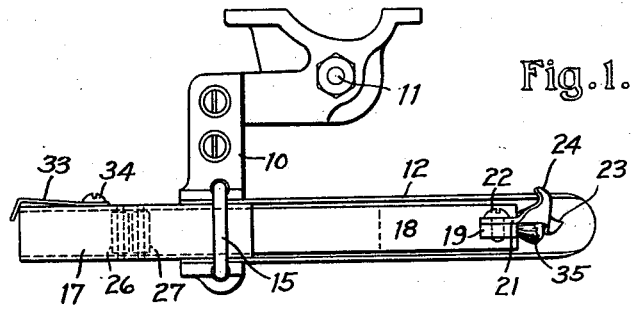
Fig. 1.
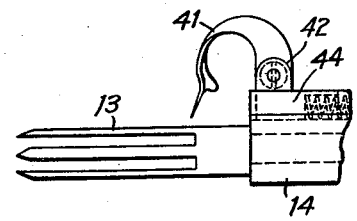
Fig. 2.
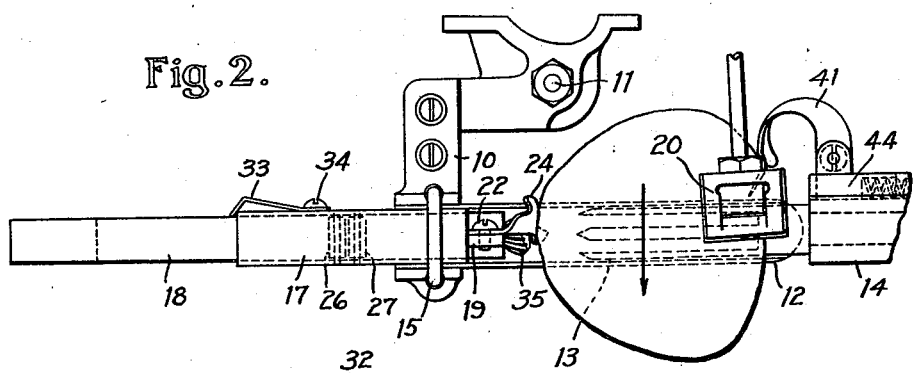
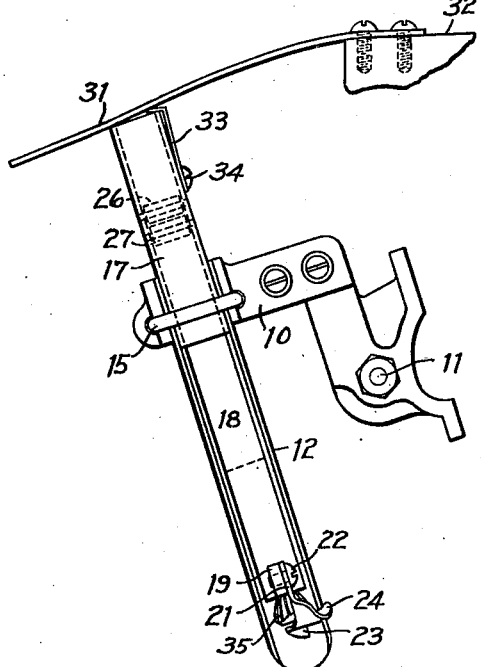
Fig. 3.
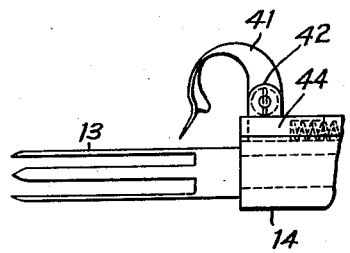
Witnesses:
E. W. Carroll
D. Gurnee
Inventor:
Herbert T. Donovan
Attorneys:
Osgood, Davis & Dorsey

H. T. DONOVAN.
PARING MACHINE.
APPLICATION FILED DEC. 22, 1910.

1,013,280.

Patented Jan. 2, 1912.

2 SHEETS—SHEET 2.

Witnesses:
E. W. Carroll
W. Gurnee

Inventor:
Herbert T. Donovan
Attorneys:
Osgood, Davis & Dorsey

UNITED STATES PATENT OFFICE.

HERBERT T. DONOVAN, OF WEST WEBSTER, NEW YORK.

PARING-MACHINE.

1,013,280. Specification of Letters Patent. Patented Jan. 2, 1912.

Application filed December 22, 1910. Serial No. 598,878.

*To all whom it may concern:*

Be it known that I, HERBERT T. DONOVAN, a subject of the King of Great Britain, and resident of West Webster, in the county of Monroe and State of New York, have invented certain new and useful Improvements in Paring-Machines, of which the following is a specification.

This invention relates to machines for paring, or for paring and coring, apples and other fruit.

In machines of the kind in question it is common to employ a rotating fork, upon which the fruit to be operated upon is impaled, in connection with a paring-knife which engages and progresses over the surface of the fruit during its rotation, thereby removing a continuous spiral paring from the fruit. In this method of paring it has been found that the paring-knife will not operate effectively upon the extremities of an apple, so that a portion of the skin is left in the vicinity of each end of the core. When the core is also removed by the same machine, as is commonly the case, the skin so left takes the form of a ring surrounding the end of the hole produced by the corer.

The object of the present invention is to provide novel and simple means, for use in connection with a paring or paring and coring machine, by which the portion of skin remaining as just described may be removed or trimmed from the fruit, thereby avoiding the labor and the waste of material involved in removing this skin by hand, as is now commonly done.

The invention comprises a trimming-cutter of novel and effective form, and this trimming-cutter is adapted for use to trim either end of a fruit. In this respect, it is applicable in place of the trimming-cutters which have heretofore been employed with some success to trim the end of the apple which is adjacent the base of the fork. It is also applicable, however, to trim the other end of the apple, an operation which has not heretofore been successfully performed, so far as the inventor is aware, and in this connection the invention comprises, further, novel and simple means for supporting the trimming-cutter and presenting it to the end of the apple, and particularly an arrangement in which the trimming-cutter is adapted to be carried and actuated by the head upon which the corer is mounted, in machines of the type in common use.

Other features of the invention will be more particularly referred to in connection with the following description of the illustrated embodiment of the invention.

Figure 5:
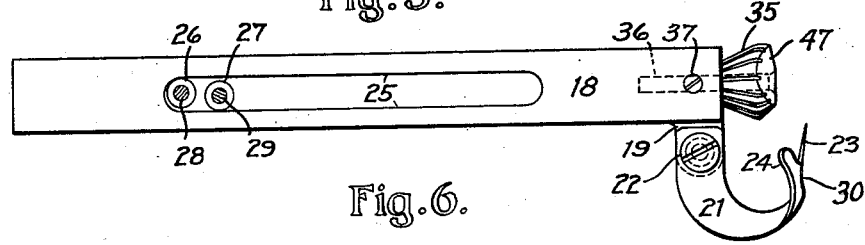
Figure 6:
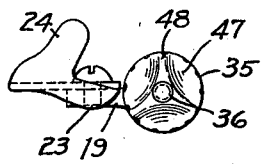
Figure 7:
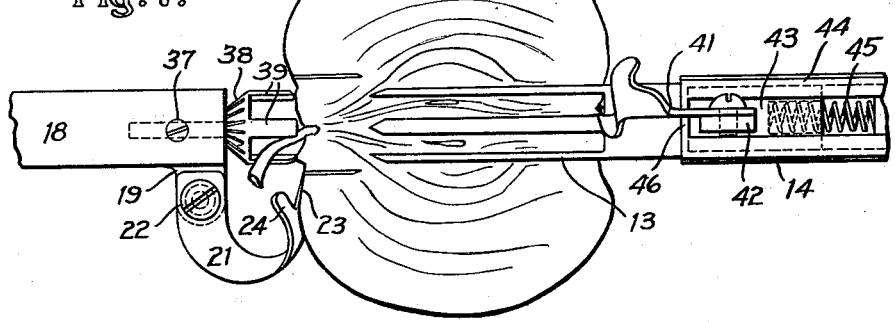
Figure 8:
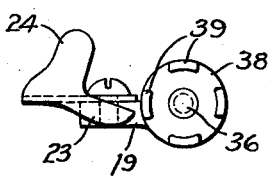

In the drawings:—Figure 1 is a side-elevation of portions of an apple-paring and coring machine of ordinary form, including the fork, the corer and the corer-head, together with trimming devices embodying the present invention; Fig. 2 is a similar view of the same parts in operative position, showing also the paring-knife of the machine and an apple upon the fork; Fig. 3 is a view similar to Fig. 1, except that it shows the corer-head in position to discharge the apple; Fig. 4 is a plan-view of the fork, the corer and the trimming devices, in operation upon an apple, the apple and the corer-head being shown in section; Fig. 5 is a plan-view, on an enlarged scale, of one of the trimming-cutters, together with the core-gage and the slide by which the operation of the cutter is controlled; Fig. 6 is a right-hand end-view of the parts shown in Fig. 5; Fig. 7 is a plan-view of the trimming-cutter, the fork and the core-gage, on an enlarged scale, showing a core-gage of modified form in operation on an apple, the apple being shown in section; and Fig. 8 is a right-hand end-view of the trimming-cutter and the core-gage in Fig. 7.

The invention is illutrated as applied to an apple-paring and coring machine of a well-known type, of which the essential instrumentalities are disclosed, for example, in the patents to Boutell, Nos. 693,778, granted Feb. 18, 1902, and 892,394, granted July 7, 1908. As the construction and operation of machines of this type are well known, the drawings illustrate only the corer-head 10 and the corer 12 mounted thereon, the U-bolt 15 by which the corer is mounted in the corer-head, the paring-knife 20, the rotating fork 13, and the bearing or frame-member 14 within which the fork-shaft is journaled. The corer-head is pivotally mounted at 11 upon the usual carriage (not shown) so as to have the horizontal movements and the pivotal movements usual in machines of this type.

The trimming-cutter constituting a feature of the present invention, is shown as applied to the machine in duplicate, in order to trim both ends of the apple. To trim the end of the apple which is presented toward the corer, and which is usually the blossom end of the apple, a trimming-cutter is mounted indirectly upon the corer-head 10 so as to be operated in connection with the corer. To this end a sleeve 17 is clamped within the usual concave corer 12, this sleeve being secured in place by the usual U-bolt 15, of which the ends pass through the corer head 10 and are secured by nuts 16. Within the sleeve 17 is a slide 18, in the form of a cylindrical rod, which moves longitudinally in the sleeve through a limited distance. At the right-hand end of the slide 18 is a lug 19 upon which the stem 21 of the trimming-cutter is seated. The stem is secured to the lug by means of a screw 22, and, as shown in dotted lines in Fig. 5, the hole in the stem 21 is somewhat larger than the screw, to permit adjustment of the cutter in various directions.

The trimming-cutter is shown as constructed of a single piece of sheet-metal which is provided with two operative extremities 23 and 24 constituting, respectively, a blade and a guard. The blade is sharpened upon its upper edge so as to cut into the apple and trim it at the required point. The guard, at its base, is in the same plane as the blade, and at this point the surface presented toward the apple is somewhat concave, as indicated at 30 in Fig. 5, so as to fit the form of the apple. From the point 30 the guard extends upwardly in advance of the blade, and is curved backwardly therefrom so as to ride freely over the surface of the apple. An important feature of the arrangement of the guard and the blade resides in the fact that while the guard extends in advance of the blade, it does not lie directly in front of the edge of the blade, but engages the apple outside of the path of operation of the blade. By this arrangement the formation of a restricted space between the blade and the guard, in which the paring might become lodged, is avoided, and, furthermore, the guard always bears upon a portion of the apple which is not operated upon by the blade, so that after the latter has operated during a complete rotation of the apple the guard tends to prevent further cutting action, and thus only the necessary amount of material is removed to perform the trimming operation.

The movements of the slide 18 and of the trimming-cutter carried thereby are limited by means of a slot 25 formed in the slide and two anti-friction rollers 26 and 27 lying within the slot. These rollers are journaled upon pins 28 and 29, of which the ends are fixed in the upper and lower portions of the sleeve 17. The rollers are slightly offset from each other in a horizontal direction, as shown particularly in Fig. 5, so that when the drag of the work upon the trimming-cutter tends to rock or rotate the slide in the sleeve, one of the rollers is engaged by an upper edge of the slot and the other roller is engaged by a lower edge of the slot, and thus the rollers are free to rotate independently in opposite directions and facilitate longitudinal movement of the slide in the sleeve.

The position occupied by the parts just described at the commencement of the operation on an apple is shown in Figs. 1 and 4. As the corer enters the apple in consequence of a right-hand horizontal movement of the corer-head, the trimming-cutter is brought into engagement with the blossom-end of the apple, as shown in Fig. 4. As the horizontal movement of the corer continues, the slide 18 is forced backwardly in the sleeve 17 until it assumes the position of Fig. 2. This sliding movement is resisted only by a slight amount of friction between the parts, but this resistance is sufficient to maintain the trimming-cutter in operative engagement with the apple. After the apple has been completely pared and cored, as in Fig. 2, the corer is withdrawn from the fork, in the usual manner, by a left-hand horizontal movement, and then the corer-head swings about its pivotal support 11 to the position shown in Fig. 3, the apple being thereby discharged from the corer by means of the usual stripper (not shown). When the corer-head swings to the position just described the slide 18 descends, through the action of gravity, in the sleeve 17, thus resuming its original position illustrated in Fig. 1, and the trimmer is then ready to operate again when the corer next engages an apple. To insure this return movement of the slide in case of any accidental clogging or frictional resistance, or in machines of the type in which the corer-head has no swinging movement, a spring-arm 31 is fixed upon any convenient part 32 of the frame of the machine, in such position that it will be engaged by the end of the slide when the corer is retracted.

To insure against the accidental displacement of the slide 18, after it has descended as just described and while the corer-head is swinging back to normal position, a light spring 33 is secured, by means of a screw 34, upon the upper surface of the sleeve 17. The extremity of this spring is bent downwardly at the left-hand end of the sleeve, so that when the slide moves to the position of Figs. 1 and 3 the end of the spring engages the end of the slide and thus frictionally resists retracting movement of the slide. This spring yields readily when the slide is moved rearwardly by contact of the trimming devices with the apple, but it supplies a slight frictional resistance which insures operative engagement of the apple by the trimmer.

While the guard 24, under ordinary circumstances, limits the cut of the blade 23, it is desirable to employ further means for this purpose, as defective or partially-decayed apples are sometimes encountered in which the substance is not sufficiently firm to coöperate effectively with the guard and resist the tendency of the blade to draw into the apple. For this reason I employ a device adapted to engage the end of the core of the apple and to determine thereby the depth of cut. This core-gage is in the form of a roller 35 which is loosely journaled upon a stud 36 seated in the right-hand end of the slide 18. The stud is secured in place by means of a set-screw 37. In the normal operation of the device the core-gage engages the blossom-end of the core, and thus assists the left-hand movement of the slide in case the guard 24 is not adequate for this purpose. The rear surface of the core-gage is serrated, as shown in the drawings, for the purpose of causing the core-gage to perform the further function of a clearing device. As the core-gage is rotated by contact with the apple these serrations act upon any paring which may have become lodged within the space between the trimming-cutter and the other parts, and tend to expel them.

The core-gage performs a third function, in that it is a protective device to prevent injury to the fork or the trimmer, in case these parts are brought into contact during the operation of the machine. The fork and the carriage and other parts of the machine perform their functions continuously during the operation of the machine, but the operator sometimes fails to place an apple upon the fork at the proper moment, with the result that when the corer advances toward the fork there is nothing upon the fork to force the slide 18 backward in its supporting sleeve. In such a case, however, the extremities of the fork engage the core-gage, and, as this is free to rotate with the fork, no damage is done to the latter or to the trimmer. The face of the core-gage has several beveled portions 47 alternating with projections 48. This form conduces to uniformity in the operation of the gage, for in the case of an apple of irregular formation any prominence in the surface of the apple, such as is frequently found at one side of the blossom-end, will be accommodated by the space produced by one or another of the bevels, while the projections 48 will engage the apple at other points and determine the action of the cutter the same as in the case of a symmetrical apple. The projections 48 also act, when engaged by the points of the fork, to insure the rotation of the core-gage and thus prevent scoring of the gage or wear on the points of the fork.

While the apple is usually cored with the blossom-end at the left, as illustrated in Figs. 2 and 4, it may sometimes be preferred to place the apple upon the fork in the opposite position. In such a case I employ the form of core-gage illustrated in Figs. 7 and 8. This core-gage has a rear, annular, serrated portion 38 and several separated blunt prongs or abutments 39 extending from the face of the device. These prongs are adapted to engage the end of the apple, while they permit the stem to project through the space between any two of the prongs, as shown in Fig. 7. The operation of this device, in general, is the same as that of the core-gage 35 before described.

The peculiar arrangement of the blade and the guard of the trimmer heretofore described is useful in connection with a trimmer employed to trim the end of the apple which is presented toward the base of the fork, in place of the trimming-cutters of ordinary form usually employed at this point. In Figs. 1, 2, 3, 4 and 7 a trimming-cutter 41 is illustrated in such connection, this cutter being of substantially the same form as the trimming-cutter mounted upon the slide 18.

Instead of being mounted rigidly in the usual manner, the trimming-cutter 41 is arranged to engage the apple yieldingly. To this end it is screwed to a lug 42 on a slide 43 which moves in a guide 44 on the frame-member 14. The slide is pressed forward by a spring 45, its normal position being determined by a lug 46 at the left-hand end of the guide. With trimming-knives rigidly mounted, in the ordinary manner, the operator, in placing an apple on the fork, sometimes uses more force than is necessary, particularly in the case of a partly decayed apple, with the result that the apple may be split by the fork and the knife, and the operator's hand is frequently injured in this manner by engagement with the fork. The employment of a yieldingly-mounted trimming-cutter provided with a guard reduces or eliminates this danger and constitutes a valuable feature of the invention.

My invention is not limited to the details of construction and operation of the illustrated embodiment thereof, but may be embodied in various other forms within the nature of the invention as it is defined in the following claims.

I claim:—

1. An end-trimmer for paring machines comprising a blade and a guard, the guard extending in advance of the blade but lying outside the path of operation thereof so as to limit the depth of cut without confining the paring produced by the blade.

2. An end-trimmer for paring machines comprising a blade, and a guard projecting from the plane of the blade and extending backwardly in advance of the blade, the guard lying outside of the path of operation of the blade so as not to confine the paring produced by the blade.

3. An end-trimmer for paring machines having, in combination, a trimming-cutter adapted to engage and trim a fruit adjacent the end of its core, a blunt core-gage adapted to abut against the end of the fruit and limit the depth of the cut, and means for connecting and yieldingly supporting the trimming-cutter and the core-gage.

4. An end-trimmer for paring machines having, in combination, a trimming-cutter adapted to engage and trim a fruit adjacent the end of its core, a rotatably-mounted blunt core-gage adapted to abut against the end of the fruit and limit the depth of the cut, and means for connecting and yieldingly supporting the trimming-cutter and the core-gage.

5. An end-trimmer for paring machines having, in combination, a trimming-cutter adapted to engage and trim a fruit adjacent the end of its core, a serrated, rotatively-mounted blunt core-gage adapted to abut against the end of the fruit and limit the depth of the cut, and means for connecting and yieldingly supporting the trimming-cutter and the core-gage.

6. An end-trimmer for paring machines having, in combination, a trimming-cutter adapted to engage and trim a fruit adjacent the end of its core, a rotatably-mounted core-gage having blunt prongs adapted to abut against the end of the fruit and limit the depth of the cut, and means for connecting and yieldingly supporting the trimming-cutter and the core-gage.

7. An end-trimmer for paring machines having, in combination, a trimming-cutter adapted to engage and trim a fruit adjacent the end of its core, a slide upon which the trimming-cutter is mounted, and a member provided with a bearing for said slide and adapted to be mounted upon the corer-head of a paring machine, the slide being yieldingly held by said member so as to be adapted to yield when the trimming-cutter engages the fruit and during the advancing movement of the corer-head.

8. An end-trimmer for paring machines having, in combination, a trimming-cutter adapted to engage and trim a fruit adjacent the end of its core, a slide upon which the trimming-cutter is mounted, a member provided with a bearing for said slide and adapted to be mounted upon the corer-head of a paring machine, the slide being normally longitudinally movable in said bearing, and yielding frictional means for controlling the movement of the slide in its bearing.

9. An end-trimmer for paring machines having, in combination, a trimming-cutter adapted to engage and trim a fruit adjacent the end of its core, a slide upon which the trimming-cutter is mounted, a member provided with a bearing for said slide and adapted to be mounted upon the corer-head of a paring machine, the slide being normally longitudinally movable in said bearing, and yielding means for holding the slide in operative position in its bearing.

10. An end-trimmer having, in combination with the corer-head of a paring machine, a trimming-cutter adapted to engage and trim a fruit adjacent the end of its core, a slide upon which the trimming-cutter is mounted, a member provided with a bearing for said slide and mounted upon the corer-head, and a gage mounted upon the end of the slide and adapted to engage the end of the fruit and limit the operation of the trimming-cutter.

11. An end-trimmer having, in combination with the corer-head of a paring machine, a trimming-cutter adapted to engage and trim a fruit adjacent the end of its core, a slide upon which the trimming-cutter is mounted, a member provided with a bearing for said slide and mounted upon the corer-head, and a core-gage rotatably mounted upon the end of the slide adjacent the trimming-cutter and adapted to engage the end of the fruit and limit the operation of the trimming-cutter.

12. In a paring machine, the combination, with a swinging corer-head and a corer carried thereby, of a slide-guide mounted on the corer-head so as to swing therewith, a slide carried by said guide and yieldingly held against movement therein, the slide being free to fall by gravity in the guide when the corer-head is swung into position to discharge a fruit from the corer, and an end-trimming knife carried by the slide.

13. In a paring machine, the combination, with a swinging corer-head and a corer carried thereby, of a slide-guide mounted on the corer-head so as to swing therewith, a slide mounted in the guide and yieldingly movable therein, and means to engage the slide and advance it in the guide when the corer-head is swung into position to discharge a fruit from the corer.

14. In a paring machine, the combination, with means for supporting and rotating a fruit, of an end-trimmer movable toward the end of the fruit and comprising a trimming-knife, means connected with the knife and engaging the portions of the surface of the fruit both inside of and outside of the path of operation of the knife so as to limit the depth of cut of the knife by such engagement, and means for yieldingly maintaining the knife in engagement with the end of the fruit while it operates thereon.

15. A paring machine having, in combination, a rotative fork, a trimming-cutter supported opposite the fork and adapted to engage the end of a fruit thereon, a support for the trimming-cutter, and a rotative device journaled upon said support and adapted to engage the end of the fork when there is no fruit on the latter.

16. A paring machine having, in combination, a rotative fork, a trimming-cutter supported opposite the fork and adapted to engage the end of a fruit thereon, a support for the trimming-cutter, and a serrated rotative device journaled upon said support and adapted to engage the end of the fork when there is no fruit on the latter.

17. An end-trimmer for paring machines having, in combination, a trimming-cutter adapted to engage and trim a fruit adjacent the end of its core, and a core-gage connected with the trimming-cutter and having a plurality of projections to engage the end of the fruit and intervening recesses to receive irregular prominences on the fruit.

18. In a paring machine, the combination, with a swinging corer-head and a corer carried thereby, of a slide-guide mounted on the corer-head so as to swing therewith, a slide movable in said guide, and an end-trimming knife carried by the slide.

19. In a paring machine, the combination, with a swinging corer-head and a corer carried thereby, of a slide-guide mounted on the corer-head so as to swing therewith, a slide yieldingly movable in said guide, an end-trimming knife carried by the slide, and resilient means for resisting rearward movement of the slide in the slide-guide.

20. In a paring machine, the combination, with a swinging corer-head and a corer carried thereby, of a slide-guide mounted on the corer-head, a slide movable in said guide an end-trimming knife carried by the slide, and a core-gage carried and freely rotatable upon the forward end of the slide and adapted to abut against the end of the fruit and limit the depth of cut of the trimming-knife.

21. In a paring machine, the combination, with a swinging corer-head and a corer carried thereby, of a slide-guide mounted in the hollow of the corer, a slide movable in said guide, an end-trimming knife carried by the slide, and means for engaging the fruit and limiting the depth of cut of the trimming-knife.

HERBERT T. DONOVAN.

Witnesses:
 FARNUM F. DORSEY,
 D. GURNEE.

Copies of this patent may be obtained for five cents each, by addressing the "Commissioner of Patents, Washington, D. C."